US008783793B2

(12) United States Patent
Terashima et al.

(10) Patent No.: US 8,783,793 B2
(45) Date of Patent: Jul. 22, 2014

(54) BRAKE APPARATUS (75) Inventors: Kazuya Terashima, Isehara (JP); Katsuma Tsuruoka, Atsugi (JP); Koji Numakura, Atsugi (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 259 days.

(21) Appl. No.: 13/301,857

(22) Filed: Nov. 22, 2011

(65) Prior Publication Data

US 2012/0139332 A1 Jun. 7, 2012

(30) Foreign Application Priority Data

Dec. 6, 2010 (JP) ................... 2010-271206
Dec. 6, 2010 (JP) ................... 2010-271208
Dec. 22, 2010 (JP) ................... 2010-285256

(51) Int. Cl.
  *B60T 8/42* (2006.01)
(52) U.S. Cl.
  USPC ............. 303/115.1; 303/115.4; 303/DIG. 11; 138/31
(58) Field of Classification Search
  USPC .......... 303/115.1, 115.4, 113.2, 114.1, 119.2, 303/87, DIG. 11; 92/96; 137/596.17, 137/614.14; 138/30, 31
  See application file for complete search history.

(56) References Cited

U.S. PATENT DOCUMENTS

| 6,302,498 | B1 * | 10/2001 | Ariki et al. ................. 303/115.4 |
| 7,543,896 | B2 | 6/2009 | Ariki et al. |
| 8,215,724 | B2 * | 7/2012 | Aoba et al. ................. 303/115.4 |

FOREIGN PATENT DOCUMENTS

| JP | 11-208440 | 8/1999 |
| JP | 2006-151362 | 6/2006 |
| JP | 3937554 | 4/2007 |
| JP | 2008-106905 | 5/2008 |

* cited by examiner

*Primary Examiner* — Pamela Rodriguez
(74) *Attorney, Agent, or Firm* — Antonelli, Terry, Stout & Kraus, LLP.

(57) ABSTRACT

A brake apparatus including a piston body disposed in a closed-ended bore in a housing, a first elastic member biasing the piston body toward a closed end of the bore, and a pressure regulating valve including a valve element, a rod and a second elastic member biasing the valve element toward a seat portion and having an elastic force smaller than that of the first elastic member, the brake apparatus having a reservoir function of reserving brake fluid flowed from a vehicular wheel cylinder in the bore by strokes of the piston body upon ABS control, the piston body being a resin-molded member having a hard member on a piston crown surface, the hard member having a hardness larger than that of a resin material of the piston body, and the piston body and the rod are brought into contact with each other via the hard member.

20 Claims, 9 Drawing Sheets

BRAKE APPARATUS

BACKGROUND OF THE INVENTION

The present invention relates to a brake apparatus that has a reservoir function of reserving a brake fluid.

Japanese Patent Application Unexamined Publication No. 2006-151362 discloses a reservoir employed in a brake apparatus such as anti-lock brake system (ABS), etc., in which a piston made of a resin is used to thereby eliminate a wear ring, etc. that is required for a piston made of metal.

SUMMARY OF THE INVENTION

However, in the above-described conventional art, the reservoir tends to suffer from wear, breakage, or the like due to deterioration in strength of the piston.

It is an object of the present invention to provide a brake apparatus equipped with a piston that is made of resin and excellent in durability.

The other objects and features of this invention will become understood from the following description with reference to the accompanying drawings.

In one aspect of the present invention, there is provided a brake apparatus including:
- a housing having a fluid passage and a closed-ended bore communicated with the fluid passage;
- a piston body disposed in the closed-ended bore;
- a first elastic member that biases the piston body toward a closed end of the bore; and
- a pressure regulating valve disposed in the fluid passage, the pressure regulating valve including a valve element, a seat portion that is brought into contact with the valve element, a rod disposed between a piston crown surface of the piston body and the valve element, the rod acting to move the valve element apart from the seat portion, and a second elastic member having one end contacted with the valve element and biasing the valve element toward the seat portion, the second elastic member having an elastic force smaller than that of the first elastic member, wherein the brake apparatus has a reservoir function of reserving brake fluid flowed from a wheel cylinder of a vehicle in the closed-ended bore by strokes of the piston body when anti-lock brake system control is executed, the piston body is a resin-molded member with a hard member disposed on the piston crown surface, the hard member having a hardness larger than that of a resin material of the piston body, and the piston body and the rod are brought into contact with each other via the hard member.

In a further aspect of the present invention, there is provided a brake apparatus including:
- a piston body made of a resin material and disposed in a closed-ended bore formed in a housing, the closed-ended bore being communicated with a fluid passage formed within the housing, the piston body being moved in the closed-ended bore in an axial direction thereof when anti-lock brake system control is executed,
- a plate member disposed on a piston crown surface of the piston body, the plate member having a wear resistance higher than that of the resin material of the piston body,
- a first elastic member that biases the piston body toward a closed end of the bore; and
- a pressure regulating valve disposed in the fluid passage, the pressure regulating valve including a valve element, a seat portion that is brought into contact with the valve element, a rod disposed between the plate member and the valve element, the rod acting to move the valve element apart from the seat portion, and a second elastic member having one end contacted with the valve element and biasing the valve element toward the seat portion, the second elastic member having an elastic force smaller than that of the first elastic member.

In a still further aspect of the present invention, there is provided a brake apparatus including:
- a piston body made of a resin material and disposed in a closed-ended bore formed in a housing, the closed-ended bore being communicated with a fluid passage formed within the housing,
- a plate member made of metal and disposed on a piston crown surface of the piston body, the plate member being integrally formed with the piston body,
- a coil spring that biases the piston body toward a closed end of the bore; and
- a pressure regulating valve disposed in the fluid passage, the pressure regulating valve including a valve element, a seat portion that is brought into contact with the valve element, a rod made of metal and disposed between the plate member and the valve element, the rod acting to move the valve element apart from the seat portion, and an elastic member having one end contacted with the valve element and biasing the valve element toward the seat portion, the elastic member having an elastic force smaller than a biasing force of the coil spring, the valve element being spaced apart from the seat portion in a non-operating condition of the pressure regulating valve, wherein the brake apparatus has a reservoir function of reserving brake fluid flowed from a wheel cylinder of a vehicle in the closed-ended bore by strokes of the piston body when anti-lock brake system control is executed, the piston body has a closed-ended cylindrical shape having a closed end that supports one end of the coil spring, and the plate member has a diameter larger than an outer diameter of the coil spring.

DETAILED DESCRIPTION OF THE INVENTION

First Embodiment

[Construction of Hydraulic Circuit of Hydraulic Brake Control System]

Figure 1:
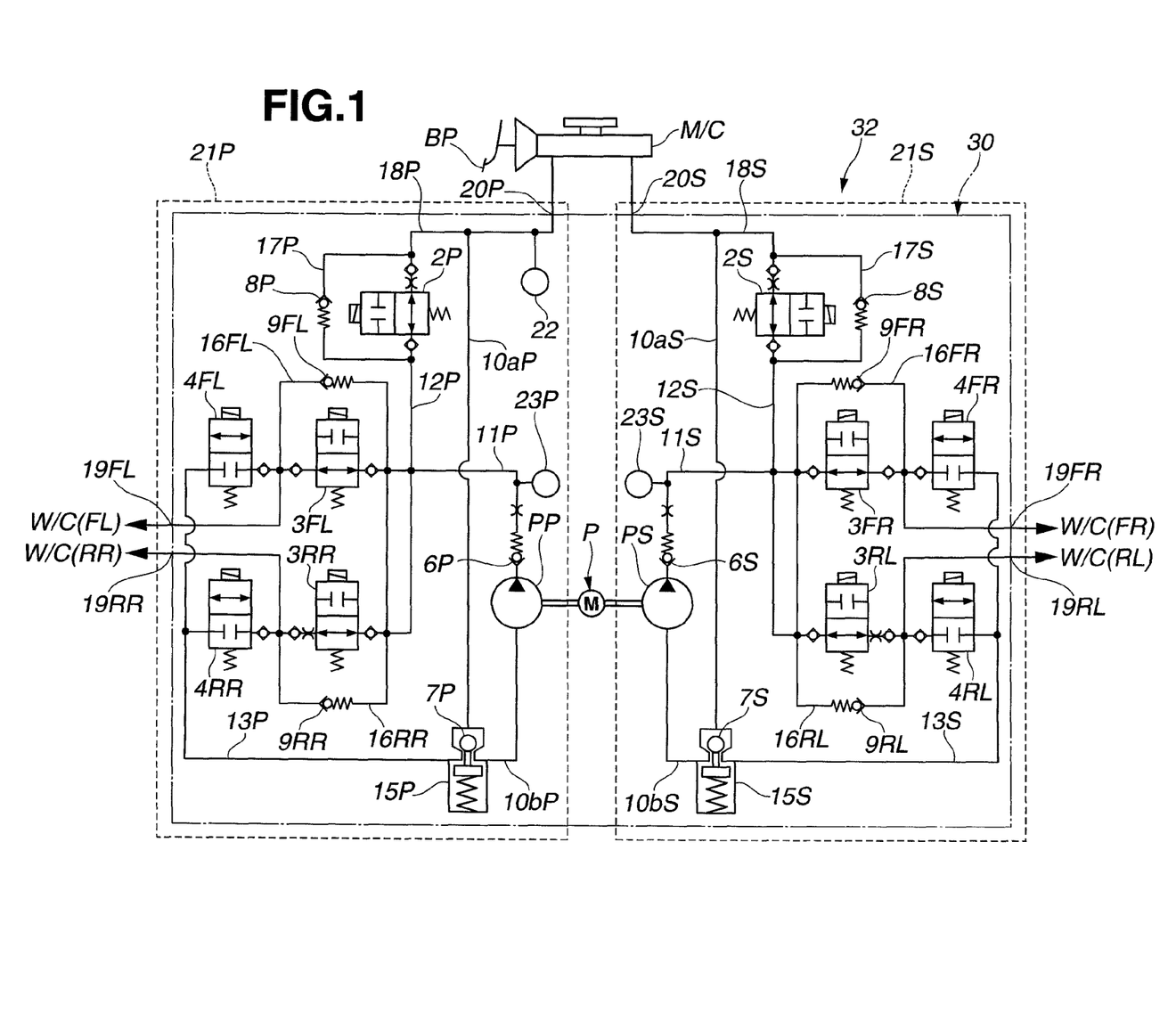
FIG. 1 is a hydraulic circuit diagram of a hydraulic brake control system to which a brake apparatus according to a first embodiment of the present invention is applicable.

FIG. 1 is a hydraulic circuit diagram of hydraulic brake control system 32 according to a first embodiment of the present invention. As shown in FIG. 1, the hydraulic circuit is formed in hydraulic control unit 30 disposed between master cylinder M/C and wheel cylinder W/C. Hydraulic control unit 30 includes generally rectangular solid-shaped housing 31 cut out from an aluminum block, and a plurality of fluid passages formed in housing 31, pump unit P, motor M, and a plurality of valves as explained below.

Hydraulic brake control system 32 performs hydraulic control in accordance with the hydraulic pressure requested in vehicle dynamics control (VDC) and anti-lock brake system (ABS) control by a controller. Hydraulic brake control system 32 has a so-called X piping construction including two systems constituted of P system hydraulic circuit 21P and S system hydraulic circuit 21S. Wheel cylinder W/C(FL) for a left front wheel and wheel cylinder W/C(RR) for a right rear wheel are connected to the P system. Wheel cylinder W/C(FR) for a right front wheel and wheel cylinder W/C(RL) for a left rear wheel are connected to the S system. Hydraulic brake control system 32 and respective wheel cylinders W/C are connected to wheel cylinder ports 19RL, 19FR, 19FL, 19RR which are formed on an upper surface of housing 31. Pump unit P is a tandem gear pump that includes external gear pumps PP and PS disposed in the P system and the S system, respectively, and is driven by single motor M.

Master cylinder M/C and hydraulic control unit 30 are connected with each other through fluid passages 18P, 18S and master cylinder ports 20P, 20S formed on a port connecting surface of housing 31. Fluid passage 18P and a suction side of gear pump PP are connected with each other through fluid passages 10aP, 10bP. Fluid passage 18S and a suction side of gear pump PS are connected with each other through fluid passages 10aS, 10bS. Master cylinder pressure sensor 22 is disposed on fluid passage 18P between master cylinder port 20P and a connecting portion in which fluid passage 18P is connected with fluid passage 10aP.

A discharge side of gear pump PP and respective wheel cylinders W/C(FL), W/C(RR) are connected with each other through fluid passages 11P. A discharge side of gear pump PS and respective wheel cylinders W/C(FR), W/C(RL) are connected with each other through fluid passages 11S. Pressure increasing valves 3FL, 3RR corresponding to wheel cylinders W/C(FL), W/C(RR) are disposed on fluid passage 11P, which are a solenoid valve of a normally open type. Pressure increasing valves 3FR, 3RL corresponding to wheel cylinders W/C(FR), W/C(RL) are disposed on fluid passage 11S, which are a solenoid valve of a normally open type. Check valve 6P is disposed on fluid passage 11P between gear pump PP and pressure increasing valves 3FL, 3RR. Check valve 6P allows a flow of brake fluid in a direction from gear pump PP toward pressure increasing valves 3FL, 3RR and inhibits a flow of brake fluid in a reverse direction from pressure increasing valves 3FL, 3RR toward gear pump PP. Check valve 6S is disposed on fluid passage 11S between gear pump PS and pressure increasing valves 3FR, 3RL. Check valve 6S allows a flow of brake fluid in a direction from gear pump PS toward pressure increasing valves 3FR, 3RL and inhibits a flow of brake fluid in a reverse direction from pressure increasing valves 3FR, 3RL toward gear pump PS. Discharge pressure sensor 23P is disposed on fluid passage 11P between pressure increasing valves 3FL, 3RR and gear pump PP. Discharge pressure sensor 23S is disposed on fluid passage 11S between pressure increasing valves 3FR, 3RL and gear pump PS.

Fluid passage 11P includes bypass passages 16FL, 16RR which bypass pressure increasing valves 3FL, 3RR, respectively. Check valves 9FL, 9RR are disposed on bypass passages 16FL, 16RR, respectively. Check valves 9FL, 9RR allow a flow of brake fluid in a direction from wheel cylinders W/C(FL), W/C(RR) toward gear pump PP, and inhibit a flow of brake fluid in a reverse direction from gear pump PP toward wheel cylinders W/C(FL), W/C(RR). Fluid passage 11S includes bypass passages 16FR, 16RL which bypass pressure increasing valves 3FR, 3RL, respectively. Check valves 9FR, 9RL are disposed on bypass passages 16FR, 16RL, respectively. Check valves 9FR, 9RL allow a flow of brake fluid in a direction from wheel cylinders W/C(FR), W/C(RL) toward gear pump PS, and inhibit a flow of brake fluid in a reverse direction from gear pump PS toward wheel cylinders W/C(FR), W/C(RL).

Master cylinder M/C is connected with fluid passages 11P, 11S through fluid passages 12P, 12S, respectively. Fluid passage 11P and fluid passage 12P are merged with each other between gear pump PP and pressure increasing valves 3FL, 3RR. Fluid passage 11S and fluid passage 12S are merged with each other between gear pump PS and pressure increasing valves 3FR, 3RL. Outflow gate valves 2P, 2S are disposed on fluid passages 12P, 12S, respectively, each being a normally open solenoid valve. Fluid passages 12P, 12S include bypass passages 17P, 17S which bypass outflow gate valves 2P, 2S, respectively. Check valves 8P, 8S are disposed on bypass passages 17P, 17S, respectively. Check valve 8P allows a flow of brake fluid in a direction from master cylinder M/C toward wheel cylinders W/C(FL), W/C(RR), and inhibits a flow of brake fluid in a reverse direction from wheel cylinders W/C(FL), W/C(RR) toward master cylinder M/C. Check valve 8S allows a flow of brake fluid in a direction from master cylinder M/C toward wheel cylinders W/C(FR), W/C(RL), and inhibits a flow of brake fluid in a reverse direction from wheel cylinders W/C(FR), W/C(RL) toward master cylinder M/C. Master cylinder M/C and reservoirs 15P, 15S are connected with each other through fluid passages 10aP, 10aS, respectively. Pressure regulating valve 7P is disposed on fluid passage 10aP between reservoir 15P and master cylinder M/C. Pressure regulating valve 7S is disposed on fluid passage 10aS between reservoir 15S and master cylinder M/C. Pressure regulating valves 7P, 7S each have a function of a check valve.

Reservoir 15P is disposed on a suction side of gear pump PP and connected with the suction side of gear pump PP through fluid passage 10bP. Reservoir 15S is disposed on a suction side of gear pump PS and connected with the suction side of gear pump PS through fluid passage 10bS.

Wheel cylinders W/C(FL), W/C(RR) are connected with fluid passage 10bP through fluid passage 13P. Pressure reducing valves 4FL, 4RR each being a normally closed solenoid valve are disposed on fluid passage 13P. Fluid passage 13P and fluid passage 10bP are merged with each other between pressure regulating valve 7P and reservoir 15P. Wheel cylinders W/C(FR), W/C(RL) are connected with fluid passage 12S through fluid passage 13S. Fluid passage 13S and fluid passage 10bS are merged with each other between pressure regulating valve 7S and reservoir 15S. Pressure reducing valves 4FR, 4RL each being a normally closed solenoid valve are disposed on fluid passage 13S.

Next, an operation of pressure regulating valves 7P, 7S respectively disposed adjacent to reservoirs 15P, 15S are explained. In a normal braking condition, that is, in a non-operating condition of the respective valves and pumps, when a brake pressure is generated in master cylinder M/C, pressure regulating valves 7P, 7S are moved to a close position to thereby block fluid communication between master cylinder M/C and reservoirs 15P, 15S. The brake fluid in master cylinder M/C is supplied to wheel cylinders W/C(FL), W/C(RR), W/C(FR), W/C(RL) through fluid passages 18P, 18S. Next, upon executing ABS control, at an initial stage, pressure increasing valves 3FL, 3RR, 3FR, 3RL are moved to a close position, and pressure reducing valves 4FL, 4RR, 4FR, 4RL are moved to an open position. The brake fluid in wheel cylinders W/C(FL), W/C(RR), W/C(FR), W/C(RL) is flowed into reservoirs 15P, 15S through fluid passages 13P, 13S. At this time, the brake fluid flowed into reservoirs 15P, 15S is sucked by pumping action of pump unit P, and then is returned to master cylinder M/C through fluid passages 11P, 11S. Upon executing VDC, outflow gate valves 2P, 2S are moved to a close position, pressure increasing valve(s) 3FL, 3RR, 3FR, 3RL corresponding to desired wheel(s) is moved to an open position, and then pump unit P is operated. In this condition, even when pressure regulating valves 7P, 7S are in the close position, an inside pressure of respective reservoirs 15P, 15S are reduced by sucking action of pump unit P so that pressure regulating valves 7P, 7S are allowed to move to the open position. As a result, the brake fluid is sucked from master cylinder M/C, and then the brake fluid pressurized is supplied to wheel cylinder(s) W/C(FL), W/C(RR), W/C(FR), W/C(RL) corresponding to the desired wheel(s).

Figure 2:
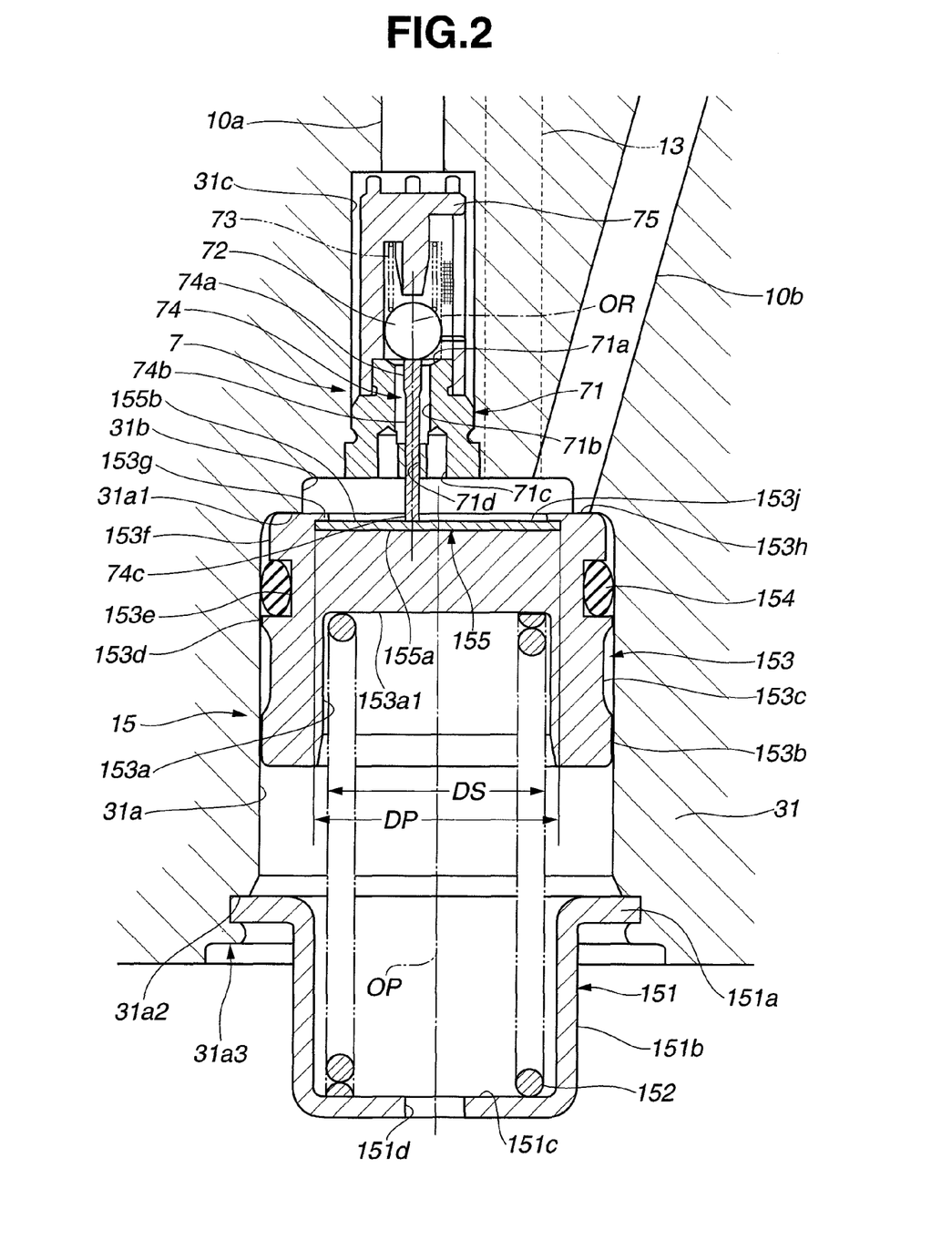
FIG. 2 is an enlarged partial cross section of the brake apparatus according to the first embodiment, showing a construction of a reservoir.

FIG. 2 is an enlarged partial cross section of the brake apparatus according to the first embodiment, showing a construction of respective reservoirs 15P, 15S. In FIG. 2, reference numerals 15, 7, 10a, 10b and 13 are used to collectively indicate reservoirs 15P, 15S, pressure regulating valves 7P, 7S, fluid passages 10aP, 10aS, fluid passages 10bP, 10bS, and fluid passages 13P, 13S, respectively. As shown in FIG. 2, housing 31 includes cylindrical closed-ended bore 31a that has one closed end and upwardly extends from a lower end surface of housing 31. Bore 31a accommodates piston body 153 as explained later. Retainer holding surface 31a2 is formed on the side of a lower open end of bore 31a on an inner circumferential surface of housing 31 which defines bore 31a. Retainer holding surface 31a2 holds retainer 151 in cooperation with caulking portion 31a3 that is formed in a position lower than retainer holding surface 31a2 on the side of the lower open end of bore 31a. Retainer 151 includes cylindrical portion 151b, flange portion 151a extending radially outwardly from an upper end of cylindrical portion 151b so as to be bent relative to cylindrical portion 151b, and a closed end portion having spring retaining surface 151c on which one end of coil spring 152 as a first elastic member is retained. The closed end portion has air hole 151d extending through a generally central portion of the closed end portion. With the provision of air hole 151d, atmospheric pressure can be always exerted on a lower portion of piston body 153 received in bore 31a.

Piston contact surface 31a1 is formed on the inner circumferential surface that defines bore 31a, on the side of the closed end of bore 31a. Piston contact surface 31a1 is brought into contact with piston surface 153h of piston body 153. Small-diameter cylindrical portion 31b that has a diameter smaller than a diameter of piston contact surface 31a1 is formed in a central portion of the closed end of bore 31a. Small-diameter cylindrical portion 31b is connected with fluid passage 13 communicated with pressure reducing valves 4FL, 4RR and 4FR, 4RL, and with fluid passage 10b communicated with the suction side of pump unit P. Pressure regulating valve accommodating bore 31c is formed on an upper side of small-diameter cylindrical portion 31b. Pressure regulating valve accommodating bore 31c has a cylindrical shape having central axis OR that is disposed offset from a central axis of bore 31a, i.e., central axis OP of piston body 153. Pressure regulating valve accommodating bore 31c has an upper end connected with fluid passage 10a communicated with master cylinder M/C.

Pressure regulating valve accommodating bore 31c accommodates respective pressure regulating valve 7. Pressure regulating valve 7 includes seat member 71, and filter member 75 that is fitted to seat member 71 and removes impurities in the brake fluid flowed from fluid passage 10a into pressure regulating valve 7. Disposed in a space surrounded by an upper portion of seat member 71 and filter member 75 are ball member (valve element) 72 and pressure regulating return spring (a second elastic member) 73 that biases ball member 72 toward seat member 71. Pressure regulating return spring 73 has an elastic force smaller than that of coil spring 152 such that in a condition where the brake fluid pressure is not applied to ball member 72, ball member 72 is upwardly pushed by the elastic force of coil spring 152 through rod 74. At this time, rod 74 is in contact with ball member 72 in an axial alignment with a center of ball member 72.

Seat member 71 has a through hole through which rod 74 extends. The through hole includes large-diameter hole portion 71b cooperating with rod 74 to form a brake fluid passage between an outer circumferential surface of rod 74 and an inner circumferential surface of seat member 71 which defines large-diameter hole portion 71b, and rod retaining hole portion 71d that has a diameter smaller than a diameter of large-diameter hole portion 71b and retains rod 74 in a radial direction thereof. A plurality of communicating holes 71c are formed in a lower portion of seat member 71 on a radial outside of rod retaining hole portion 71d so as to surround rod retaining hole portion 71d. Communicating holes 71c extend upwardly from a lower end of seat member 71, and are partially communicated with a lower end portion of large-diameter hole portion 71b. Frustoconical seat portion 71a is formed on an upper end side of large-diameter hole portion 71b which is opposed to ball member 72. When ball member 72 is seated on seat portion 71a, a fluid communication between fluid passage 10a and small-diameter cylindrical portion 31b of bore 31a is inhibited. On the other hand, when ball member 72 is pushed upwardly against the elastic force of pressure regulating return spring 73 by rod 74, the brake fluid supplied through fluid passage 10a is allowed to pass through a filter of filter member 75, the brake fluid passage formed between large-diameter hole portion 71b and the outer circumferential surface of rod 74, and communicating holes 71c and flow into small-diameter cylindrical portion 31b.

Rod 74 is a rod-shaped member made of metal. Rod 74 includes large-diameter one end portion 74a brought into contact with ball member 72, and small-diameter portion 74b having a diameter smaller than a diameter of one end portion 74a and a length longer than a length of one end portion 74a. The diameter of one end portion 74a is larger than rod retaining hole portion 71d. The diameter of small-diameter portion 74b is substantially same as a diameter of rod retaining hole portion 71d. The other end portion 74c of rod 74 is brought into contact with upper surface 155b of plate member 155 as explained later. Rod 74 is a separate part independent of piston body 153. When piston body 153 is downwardly moved at a stroke longer than the length of small-diameter portion 74b, the other end portion 74c is spaced apart from upper surface 155b of plate member 155. In other words, one end portion 74a serves as a stop by contacting an upper end of rod retaining hole portion 71d. Further, rod 74 is disposed in axial alignment with central axis OR of pressure regulating valve accommodating bore 31c, and therefore, disposed offset from central axis OP (rotation axis) of piston body 153.

Piston body 153 is a resin-molded member having a closed-ended cylindrical shape having inner bottom surface 153a1. An outer circumferential portion of piston body 153 includes upper outer circumferential portion 153f having a diameter slightly smaller than an inner diameter of bore 31a, annular grooved portion 153e that is formed on a lower side of upper outer circumferential portion 153f and engaged with annular seal member 154, seal member retaining portion 153d that retains annular seal member 154, reduced-diameter portion 153c formed on a lower side of seal member retaining portion 153d, and weld line formed portion 153b formed on a lower side of reduced-diameter portion 153c. Seal member retaining portion 153d has substantially the same diameter as the inner diameter of bore 31a. Reduced-diameter portion 153c has a diameter that is smaller than the inner diameter of bore 31a and substantially same as the diameter of upper outer circumferential portion 153f. Weld line formed portion 153b has substantially the same diameter as the inner diameter of bore 31a. Annular seal member 154 divides an annular clearance between the inner circumferential surface that defines bore 31a and an outer circumferential surface of piston body 153 into a fluid pressure chamber disposed on the upper side of annular seal member 154 and an air chamber disposed on the lower side of annular seal member 154.

The term "weld line" as used herein means a joint mark that is formed upon resin-molding (insert-molding), specifically, that is formed by two flows of a resin material when one of the two flows entering from a position apart from a gate into a mold cavity and the other flow entering into the mold cavity via another route are cooled and solidified while being merged with each other. Generally, the portion in which the weld line is formed tends to suffer from reduction in accuracy. In this embodiment, weld line formed portion 153b is disposed in a position lower than annular seal member 154, that is, in the air chamber. That is, piston body 153 is constructed such that the weld line is formed in a position in which high accuracy in sealability is not required. In other words, piston body 153 is constructed so as to suppress formation of the weld line in a portion in which accuracy in sealability is required.

Inner circumferential surface 153a of piston body 153 has a diameter slightly larger than outer diameter DS of coil spring 152. Inner bottom surface 153a1 of piston body 153 supports the other end of coil spring 152. Plate member 155 is disposed in a central area (i.e., piston crown surface 153j) of piston surface 153h formed on an upper surface of piston body 153. Plate member 155 is embedded in piston crown surface 153j by insert-molding. Plate member 155 is a hard member made of metal which has a hardness larger than that of the resin material of piston body 153. In this embodiment, plate member 155 is a disk-shaped member made of stainless steel and has outer diameter DP larger than outer diameter DS of coil spring 152.

Specifically, when the other end of coil spring 152 is retained by inner bottom surface 153a1 of piston body 153 made of the resin material, the elastic force of coil spring 152 is always exerted on inner bottom surface 153a1. If plate member 155 has an outer diameter smaller than the outer diameter of coil spring 152, there is generated a radial gap between an outer circumferential edge of plate member 155 and the contact portion of inner bottom surface 153a1 which is contacted with the other end of coil spring 152 when viewed in an axial direction of piston body 153. As a result, a shearing force is exerted on piston crown surface 153j to thereby cause deterioration in durability of piston body 153. In contrast, in a case where outer diameter DP of plate member 155 is larger than outer diameter DS of coil spring 152 as described in this embodiment, the outer circumferential edge of plate member 155 and the contact portion of inner bottom surface 153a1 which is contacted with the other end of coil spring 152 are aligned with each other without a radial gap therebetween when viewed in the axial direction of piston body 153. As a result, piston crown surface 153j undergoes only the elastic force of coil spring 152 and is free from a shearing force, and therefore, deterioration in durability of piston body 153 can be suppressed.

Figure 3A:
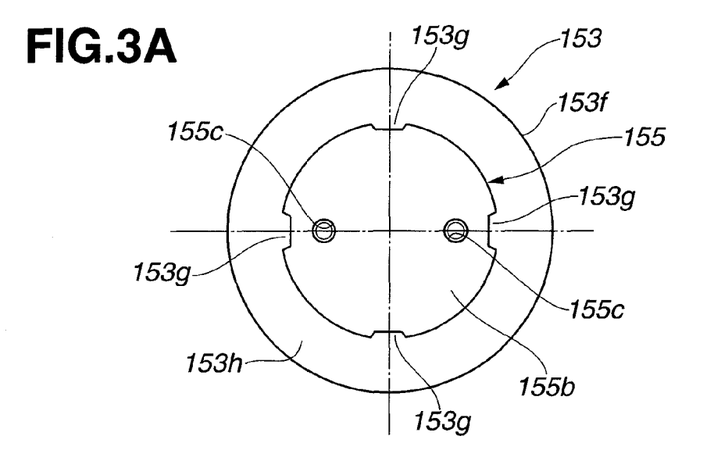
FIGS. 3A-3C are diagrams showing a piston body of the reservoir as shown in FIG. 2.
Figure 3B:
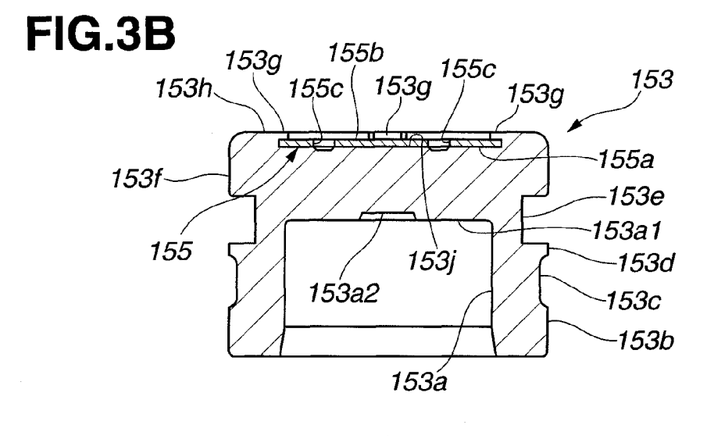
Figure 3C:
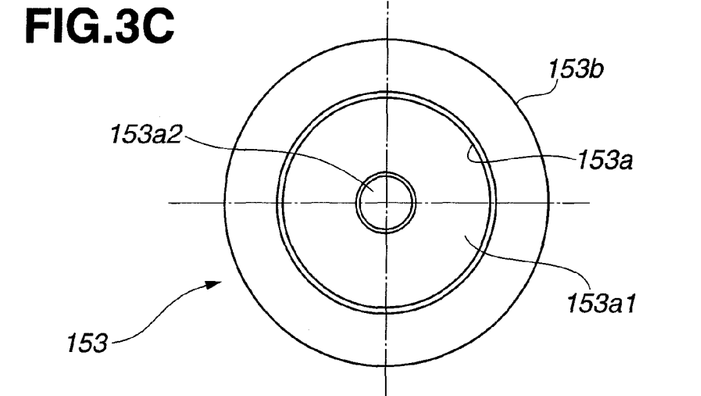

FIGS. 3A to 3C are diagrams showing piston body 153. FIG. 3A is a top plan view of piston body 153. FIG. 3B is a cross section of piston body 153, taken along the central axis of piston body 153. FIG. 3C is a bottom plan view of piston body 153. Plate member 155 is integrally formed with piston body 153 by insert-molding upon resin-molding piston body 153. Two locating holes 155c are formed on a line passing through a center of plate member 155 in a diametrically opposed relation to each other. Four lugs 153g are formed on piston surface 153h in an equidistantly spaced relation to each other in a circumferential direction of plate member 155. Lugs 153g extends over an outer periphery of an upper surface of plate member 155 and restricts plate member 155 from releasing from piston body 153. As shown in FIG. 3C, gate portion 153a2 into which a molten resin is flowed upon resin-molding piston body 153 is formed at substantially central portion of inner bottom surface 153a1. That is, the portions of piston body 153, for instance, annular grooved portion 153e engaged with annular seal member 154, and piston crown surface 153j, in which high accuracy in molding is required, are located in positions at which the molten resin is smoothly flowed. In contrast, the portions of piston body 153 on the side of the air chamber in which such a high accuracy in molding is not required are located in positions which are spaced apart from gate portion 153a2 and the molten resin does not readily reach. Further, a thickness of weld line formed portion 153b is set large such that inflow of the molten resin can be relatively easily carried out to thereby make it difficult to form a weld line even when the molten resin is cooled to a certain degree during flowing thereof.

Cylindrical piston body 153 is accommodated in bore 31a so as to be rotatable about central axis OP. For instance, a rotational force is generated by a piston action caused in accordance with flowing of the brake fluid into small-diameter cylindrical portion 31b of bore 31a or vibration transmitted from the side of the vehicle body. At this time, even when central axis OR of rod 74 is disposed offset from central axis OP of piston body 153, piston body 153 provided as the part independent from rod 74 is free from a force that acts to restrict rotation of pump body 153 in the rotational direction, and therefore, piston body 153 can be rotated. In this condition, the other end portion 74c of rod 74 is in sliding contact with upper surface 155b of plate member 155 along a circumference of a circle having a radius that corresponds to an amount of the offset of central axis OR relative to central axis OP. That is, rod 74 and plate member 155 are always contacted with each other not in the same position but in different positions in the circumferential direction of plate member 155 in accordance with rotation of piston body 153. As a result, it is possible to suppress occurrence of unbalanced wear of plate member 155 in which wear of plate member 155 occurs in the same position, and therefore, enhance durability of plate member 155.

Figure 4:
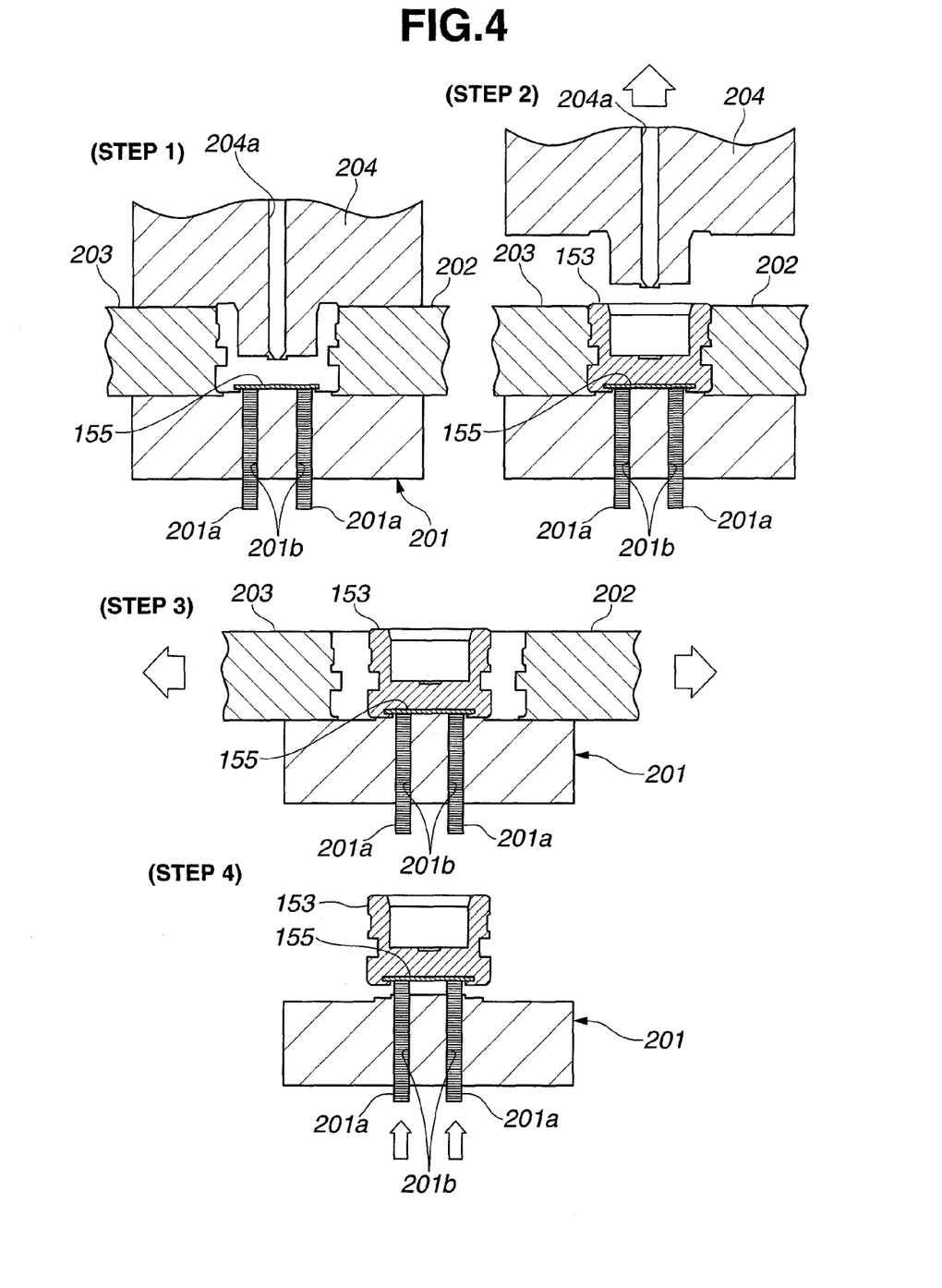
FIG. 4 is a schematic diagram showing steps of forming the piston body by insert resin-molding.

FIG. 4 is a schematic diagram showing a production process of forming piston body 153 by insert-molding using a molding apparatus. In this embodiment, the molding apparatus includes first die 201 that serves to form a piston crown side of piston body 153, second die 202 and third die 203 that are disposed on an upper surface of first die 201 in an opposed relation to each other and cooperate with each other to form the outer circumferential surface of piston body 153, and fourth die 204 that serves to form inner bottom surface 153a1 and inner circumferential surface 153a of piston body 153 and has inlet 204a through which the molten resin is injected into a mold cavity.

As shown in STEP 1 of FIG. 4, first die 201 includes two locating pins 201a inserted into through-holes 201b. Positioning of plate member 155 is carried out by inserting locating pins 201a into locating holes 155c of plate member 155. In this condition, second die 202 and third die 203 are contacted with the upper surface of first die 201, and then moved toward a central portion of the upper surface of first die 201 while keeping the contact of second die 202 and third die 203 with the upper surface of first die 201. At this time, fourth die 204 is moved downwardly and placed on upper surfaces of second and third dies 202, 203, thereby forming the mold cavity for piston body 153 in cooperation with first die 201, second die 202 and third die 203. In this condition, the molten resin is flowed into the mold cavity through inlet 204a of fourth die 204, and insert-molding is carried out.

When inflow of the molten resin is completed, the production process proceeds to STEP 2. In STEP 2, fourth die 204 is upwardly moved and taken off. Subsequently, in STEP 3, second die 202 and third die 203 are respectively moved rightward and leftward and taken off. At last, in STEP 4, locating pins 201a are pushed up, and then, first die 201 is taken off. Thus, piston body 153 is produced.

Figure 5:
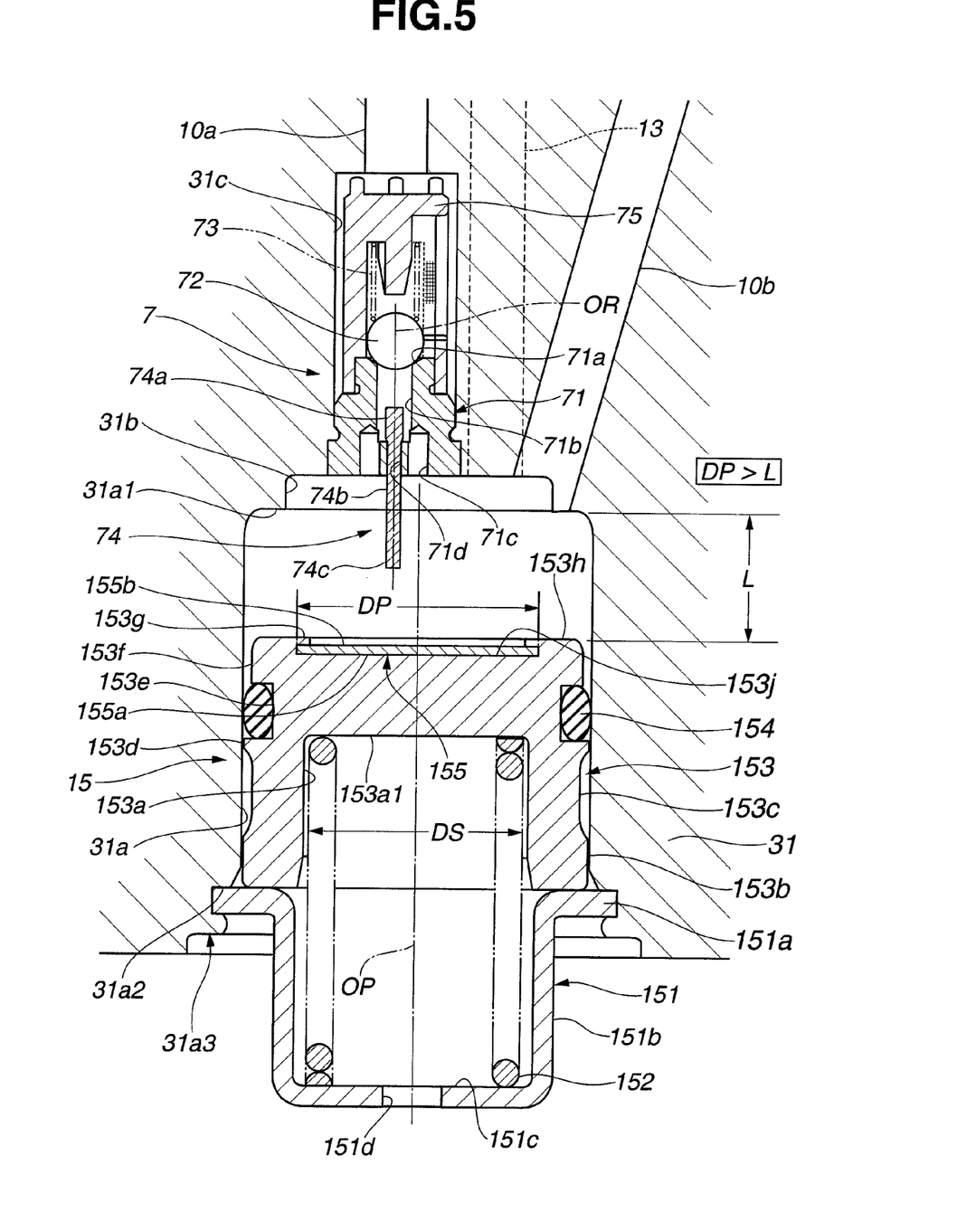
FIG. 5 is an enlarged partial cross section of the brake apparatus according to the first embodiment, showing the piston body at the bottom dead center.

FIG. 5 is an enlarged partial cross section of piston body 153 placed in a bottom dead center. The term "bottom dead center" as used herein means a lowest position of piston body 153 from which piston body 153 cannot be moved further downwardly. The brake apparatus according to this embodiment is constructed such that when piston body 153 is placed in the bottom dead center, axial distance L between piston contact surface 31a1 and piston surface 153h in the axial direction of piston body 153 (i.e., a maximum stroke amount L of piston body 153) is smaller than outer diameter DP of plate member 155. Specifically, although plate member 155 embedded in piston body 153 by insert-molding is moved together with piston body 153, it is expected that plate member 155 is released or peeled from piston body 153. In such a case, if the axial distance L is larger than the outer diameter DP, plate member 155 may be vertically raised up on piston crown surface 153j when piston body 153 is placed in the bottom dead center. Therefore, plate member 155 is jammed between piston crown surface 153j and a bottom surface of small-diameter cylindrical portion 31b of bore 31a, so that the stroke motion of piston body 153 cannot be achieved. In contrast, the brake apparatus according to this embodiment is constructed such that the relationship DP>L between the axial distance L and the outer diameter DP is satisfied. With this construction, even when plate member 155 is released or peeled from piston crown surface 153j, plate member 155 can be prevented from vertically raising up to thereby ensure the stroke motion of piston body 153 without failure. Further, the axial distance L is set between piston contact surface 31a1 and piston surface 153h in this embodiment, but the axial distance L may be set between the bottom surface of small-diameter cylindrical portion 31b of bore 31a and piston crown surface 153j. The reason therefor is that if plate member 155 having a disk shape is vertically raised up after being released or peeled from piston crown surface 153j, an outer periphery of plate member 155 can be contacted with the bottom surface of small-diameter cylindrical portion 31b while keeping contact with piston crown surface 153j.

As explained above, the brake apparatus according to the first embodiment can attain the following functions and effects (1) to (6).

(1) The brake apparatus according to the first embodiment includes housing 31 having fluid passages 10a, 10b, 13 and closed-ended bore 31a communicated with the fluid passages 10a, 10b, 13, piston body 153 disposed in closed-ended bore 31a, coil spring 152 (i.e., a first elastic member) that biases piston body 153 toward the closed end of bore 31a, and pressure regulating valve 7 disposed in fluid passage 10a, pressure regulating valve 7 including ball member 72 (i.e., a valve element), seat portion 71a that is brought into contact with ball member 72, rod 74 disposed between piston crown surface 153j of piston body 153 and ball member 72, rod 74 acting to move ball member 72 apart from seat portion 71a, and return spring 73 (i.e., a second elastic member) having one end contacted with ball member 72 and biasing ball member 72 toward seat portion 71a, return spring 73 having an elastic force smaller than that of coil spring 152, wherein the brake apparatus has a reservoir function of reserving brake fluid flowed from a wheel cylinder of a vehicle by strokes of piston body 153 when anti-lock brake system control is executed, piston body 153 is a resin-molded member with plate member 155 (i.e., a hard member) disposed on piston crown surface 153j, plate member 155 has a hardness larger than that of the resin of piston body 153, and piston body 153 and rod 74 are brought into contact with each other via plate member 155. With this construction, even when piston body 153 made of a resin material is employed in order to enhance reduction in weight and cost, wear resistance of piston crown surface 153j against rod 74 can be enhanced.

(2) Plate member 155 as the hard member is integrally formed with piston body 153. With this construction, plate member 155 can be produced simultaneously with piston body 153 upon resin-molding of piston body 153, thereby enhancing the productivity. Meanwhile, the material of plate member 155 is not limited to the metal used in the first embodiment, and may be suitably selected from other hard materials.

(3) Plate member 155 has a disk shape, coil spring 152 is the first elastic member, piston body 153 is a closed-ended cylindrical member having inner bottom surface 153a1 that retains one end of coil spring 152, and diameter DP of plate member 155 is larger than outer diameter DS of coil spring 152. With this construction, piston crown surface 153j undergoes only the elastic force of coil spring 152 so that deterioration in durability of piston body 153 can be suppressed.

(4) Diameter DP of plate member 155 is larger than maximum stroke amount L of piston body 153. Accordingly, even in a case where plate member 155 is released or peeled from piston crown surface 153j, the stroke motion of piston body 153 can be ensured without being disturbed, so that stable operation of piston body 153 can be maintained.

(5) Piston body 153 is rotatably disposed in closed-ended bore 31a, and rod 74 is disposed offset from the rotation axis of piston body 153. That is, rod 74 and plate member 155 are always contacted with each other not in the same position but in different positions in the circumferential direction of plate member 155 in accordance with rotation of piston body 153. As a result, durability of plate member 155 can be enhanced.

(6) Annular groove 153e is formed on the outer circumferential surface of piston body 153, and annular seal member 154 is engaged in annular groove 153e. Annular seal member 154 seals a clearance between the inner circumferential surface that defines closed-ended bore 31a and the outer circumferential surface of piston body 153, and divides the clearance into a fluid pressure chamber and an air chamber. Piston body 153 includes weld line formed portion 153b exposed to the air chamber. That is, piston body 153 is configured such that a weld line is formed in the portion in which high accuracy in molding is not required in view of sealability. In other words, piston body 153 is configured such that a weld line is not formed in the portion in which high accuracy in molding is required. With this configuration of piston body 153, productivity of piston body 153 can be enhanced, and necessary accuracy in molding can be ensured.

Second Embodiment

Figure 6:
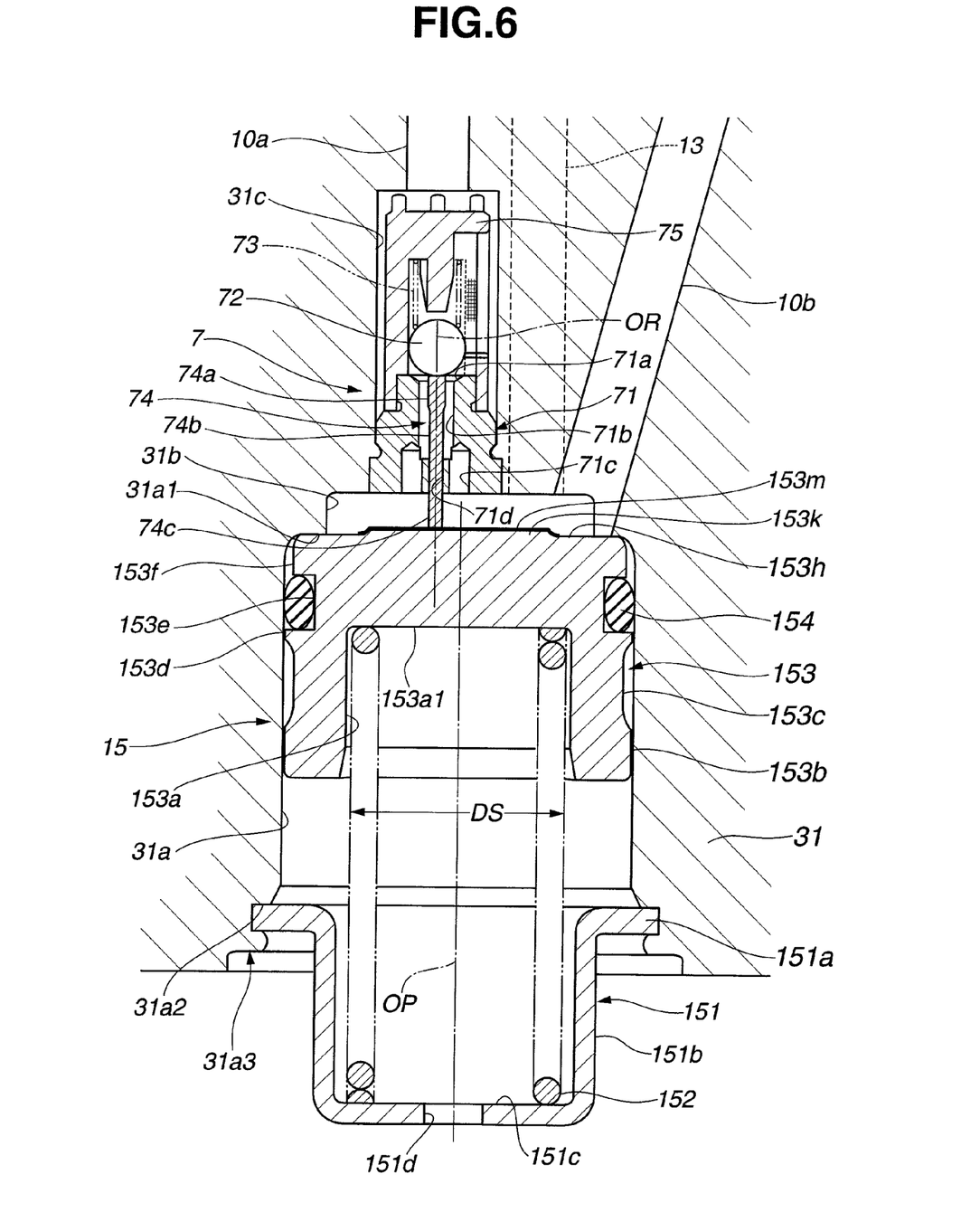
FIG. 6 is an enlarged partial cross section of the brake apparatus according to a second embodiment, showing a construction of a reservoir.

Referring to FIG. 6, the brake apparatus according to a second embodiment of the present invention is explained. FIG. 6 is an enlarged partial cross section of the brake apparatus according to the second embodiment, showing a construction of the respective reservoirs. The second embodiment differs from the first embodiment in that a vapor-deposited film is formed on the piston crown surface of the piston body of the reservoir, instead of plate member 155. Like reference numerals denote like parts, and therefore, detailed explanations therefor are omitted. As shown in FIG. 6, piston body 153 has piston crown surface 153k that is located on a dais-shaped lump portion projected from piston surface 153h. Piston crown surface 153k is covered with vapor-deposited film 153m having high wear resistance. Vapor-deposited film 153m is formed by vapor deposition. The material of vapor-deposited film 153m may be a suitable material having high wear resistance, for instance, titanium nitride, diamond-like carbon, etc.

As explained above, the brake apparatus according to the second embodiment can attain the following function and effect (7).

(7) The hard member is vapor-deposited film 153m formed on piston crown surface 153k of piston body 153 by vapor deposition. With the provision of vapor-deposited film 153m, it is possible to enhance wear resistance of piston crown surface 153k and serve for reduction in weight of piston body 153. Further, even when vapor-deposited film 153m is fallen off from piston crown surface 153k, vapor-deposited film 153m cannot disturb the motion of piston body 153. Accordingly, it is possible to increase a freedom of setting an amount of the stroke of piston body 153 toward the bottom dead center.

Third Embodiment

Figure 7A:
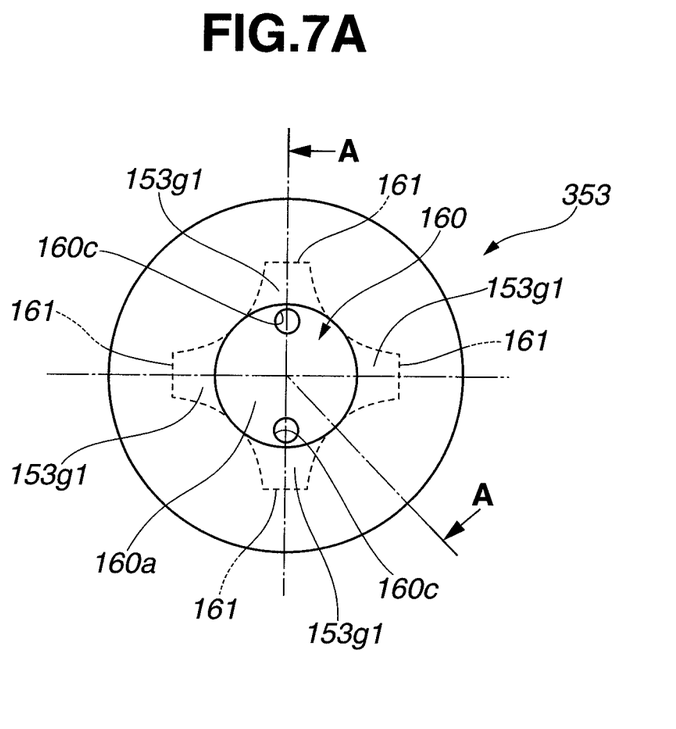
FIGS. 7A and 7B are schematic diagrams showing a piston body of the brake apparatus according to a third embodiment of the present invention.
Figure 7B:
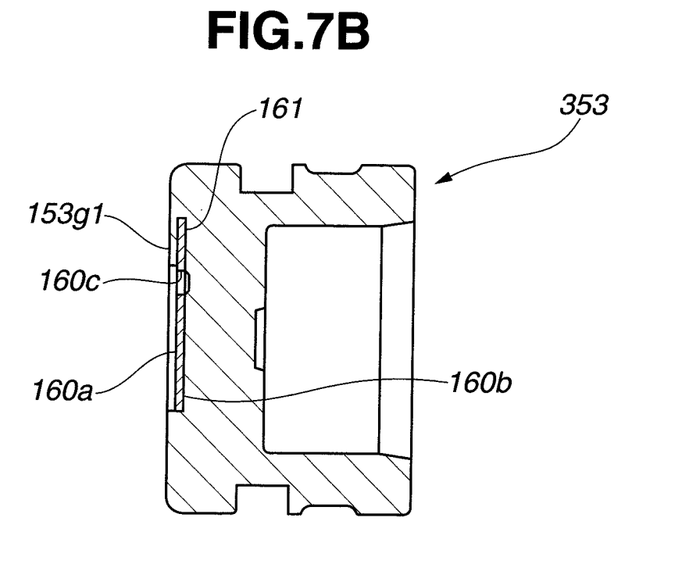

Referring to FIGS. 7A and 7B, the brake apparatus according to a third embodiment of the present invention is explained. FIGS. 7A and 7B show a schematic diagram of the piston body of the reservoir of the brake apparatus according to the third embodiment. The third embodiment differs from the first embodiment in configuration of the plate member of the piston body of the reservoir. Like reference numerals denote like parts, and therefore, detailed explanations therefor are omitted. As shown in FIG. 7A, plate member 160 in piston body 353 has a flower shape including a disk-shaped portion and a plurality of finger portions (or projections) 161, in this embodiment, four finger portions, which extend from an outer circumferential edge of the disk-shaped portion in a radially outward direction of plate member 160 and are tapered radially outwardly. Four finger portions 161 are equidistantly spaced from each other in a circumferential direction of plate member 160. Four finger portions 161 are covered with four lug portions 153g1 of piston body 353. A circular central portion of an upper surface of plate member 160 is exposed to small-diameter cylindrical portion 31b of bore 31a, and includes a circular area forming rod contact surface 160a that is brought into contact with rod 74. Lower surface 160b of plate member 160 is entirely contacted with piston crown surface 153j. Thus, plate member 160 is fixed to piston body 353 by finger portions 161 and lug portions 153g1. Further, plate member 160 has two locating holes 160c for positioning of plate member 160 which are formed in a diametrically opposed relation to each other. Similarly to plate member 155 of the first embodiment, plate member 160 is embedded in piston body 353 by insert-molding. The circular area forming rod contact surface 160a is determined such that a radial distance between the center of rod contact surface 160a and each of locating holes 160c is larger than a length corresponding to an amount of the offset of central axis OR of rod 74 relative to central axis OP of piston body 353. Piston body 353 as a whole can be reduced in weight by maintaining the above circular area forming rod contact surface 160a and reducing the remaining area except for the circular area to a minimum.

As explained above, the brake apparatus according to the third embodiment can attain the following function and effect (8).

(8) Plate member 160 includes a disk-shaped portion and finger portions (or projections) 161 formed on an outer circumferential edge of the disk-shaped portion. Plate member 160 is fixed to piston body 153 by finger portions 161. With the provision of plate member 160, it is possible to enhance wear resistance of plate member 160 and serve for reduction in weight of piston body 153 as a whole. Meanwhile, in other words, plate member 160 includes four recesses recessed from the outer circumferential edge in a radially inward direction of plate member 160, and finger portions (or projections) 161 between the adjacent two recesses.

Fourth Embodiment

Figure 8:
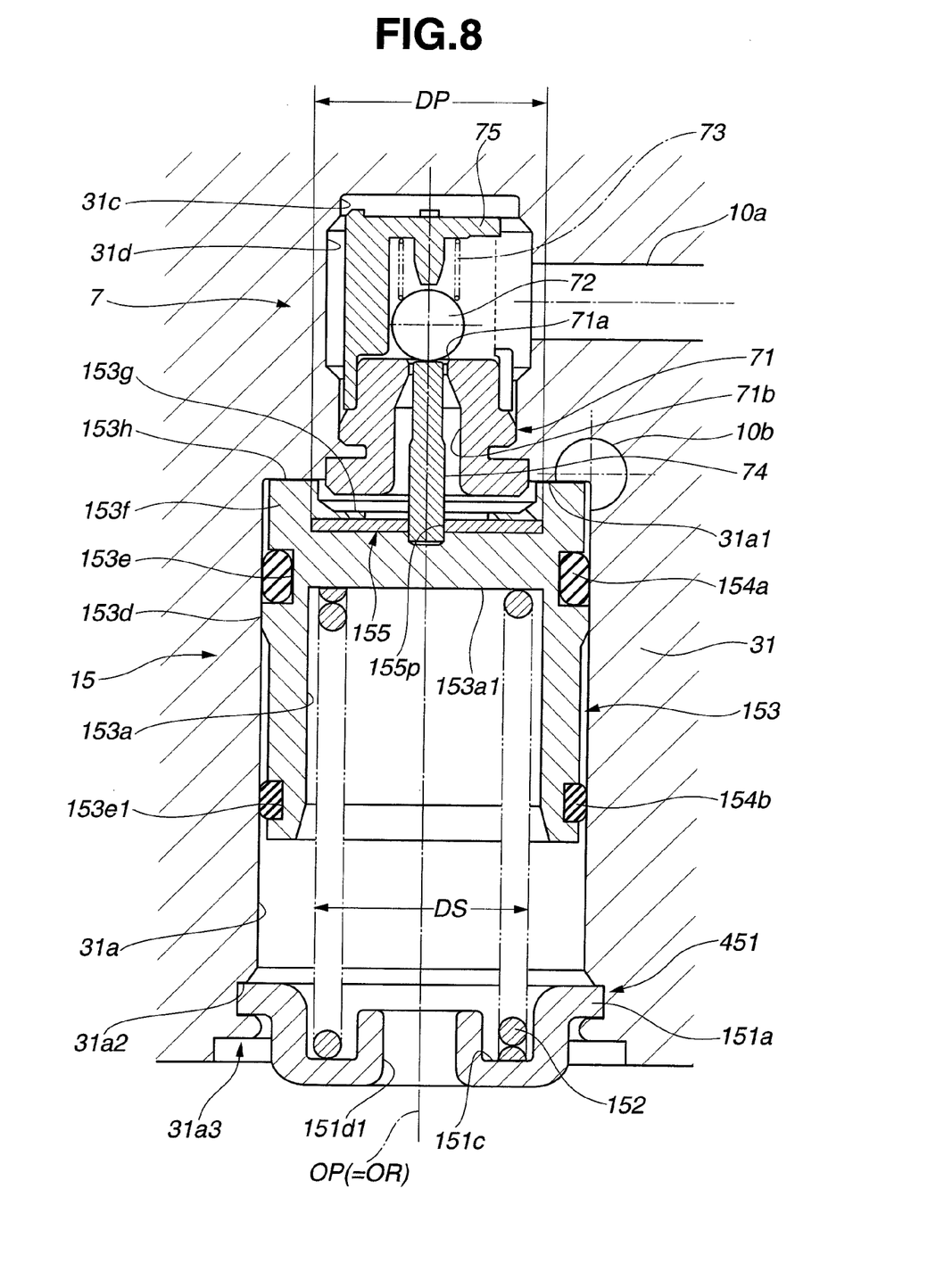
FIG. 8 is an enlarged partial cross section of the brake apparatus according to a fourth embodiment, showing a construction of a reservoir.

Referring to FIG. 8, the brake apparatus according to a fourth embodiment of the present invention is explained. FIG. 8 is an enlarged partial cross section of the brake apparatus according to the fourth embodiment, showing a construction of the respective reservoirs. The fourth embodiment differs from the first embodiment in arrangement of the rod and the piston body, construction of the pressure regulating valve accommodating bore, and arrangement of the seal member. Like reference numerals denote like parts, and therefore, detailed explanations therefor are omitted. As shown in FIG. 8, central axis OR of rod 74 is aligned with central axis OP of piston body 153. Further, pressure regulating valve accommodating bore 31c includes increased diameter portion 31d to which fluid passage 10a is connected from a radial direction of pressure regulating valve accommodating bore 31c. Further, upper annular seal member 154a and lower annular seal member 154b are arranged on piston body 153 in a spaced relation to each other in the axial direction of piston body 153. Upper annular seal member 154a and lower annular seal member 154b are engaged in upper annular groove 153e and lower annular groove 153e1, respectively, which are formed on the outer circumferential surface of piston body 153. Further, fluid passages 10b and 13 are directly opened into an upper portion of closed-ended bore 31a which is located on the upper side of upper annular seal member 154a. Further, air hole 151d1 of retainer 151 is defined by a cylindrical portion that extends from the central portion of the closed end portion of retainer 151 into bore 31a. With the provision of the cylindrical portion, retainer 151 can more stably retain coil spring 152.

Further, rod 74 and piston body 153 are formed as an integral part or one piece. Specifically, plate member 155 has rod retaining through hole 155p at a center thereof into which rod 74 is press-fitted. In the production process, plate member 155 with press-fitted rod 74 is set on first die 201, and then, piston body 153 is formed by insert-molding. With this construction of rod 74 and piston body 153 as the integral part, it is possible to enhance the assembling efficiency. Further, since rod 74 and plate member 155 are fixedly coupled to each other, it is not necessary to consider wear resistance of plate member 155, and durability of plate member 155 can be enhanced.

Here, it might be considered that rod 74 is made of the same resin material as that of piston body 153 and integrally formed with piston body 153 upon resin-molding of piston body 153. However, in such a case, it is likely that rod 74 made of the resin material fails to ensure a sufficient strength, because rod 74 is a part elongated in an axial direction thereof. In contrast, in this embodiment, rod 74 is made of metal, and further rod 74 and plate member 155 are formed as the integral part and subjected to insert-molding to form piston body 153. With this construction, strength of rod 74 can be ensured, and inclination of rod 74 can be suppressed by supporting inclination of rod 74 by plate member 155, so that durability of piston body 153 as a whole can be enhanced.

Further, since rod 74 and piston body 153 form an integral part, rod 74 is rotated about center axis OR aligned with center axis OP of piston body 153, together with piston body 153 during rotation of piston body 153. At this time, occurrence of unbalanced wear of plate member 155 can be suppressed because rod 74 and plate member 155 are formed as an integral part. In addition, rod 74 is free from undergoing a force that causes inclination of rod 74 during rotation of piston body 153.

As explained above, the brake apparatus according to the fourth embodiment can attain the following function and effect (9).

(9) Plate member 155 and rod 74 are formed as an integral part or one piece. With this construction, it is possible to enhance durability of these elements without taking into account any wear that would be caused due to the sliding contact between plate member 155 and rod 74 when formed as separate parts. Further, it is possible to ensure strength of rod 74 and support rod 74 by plate member 155. As a result, durability of piston body 153 as a whole can be enhanced.

Fifth Embodiment

Figure 9:
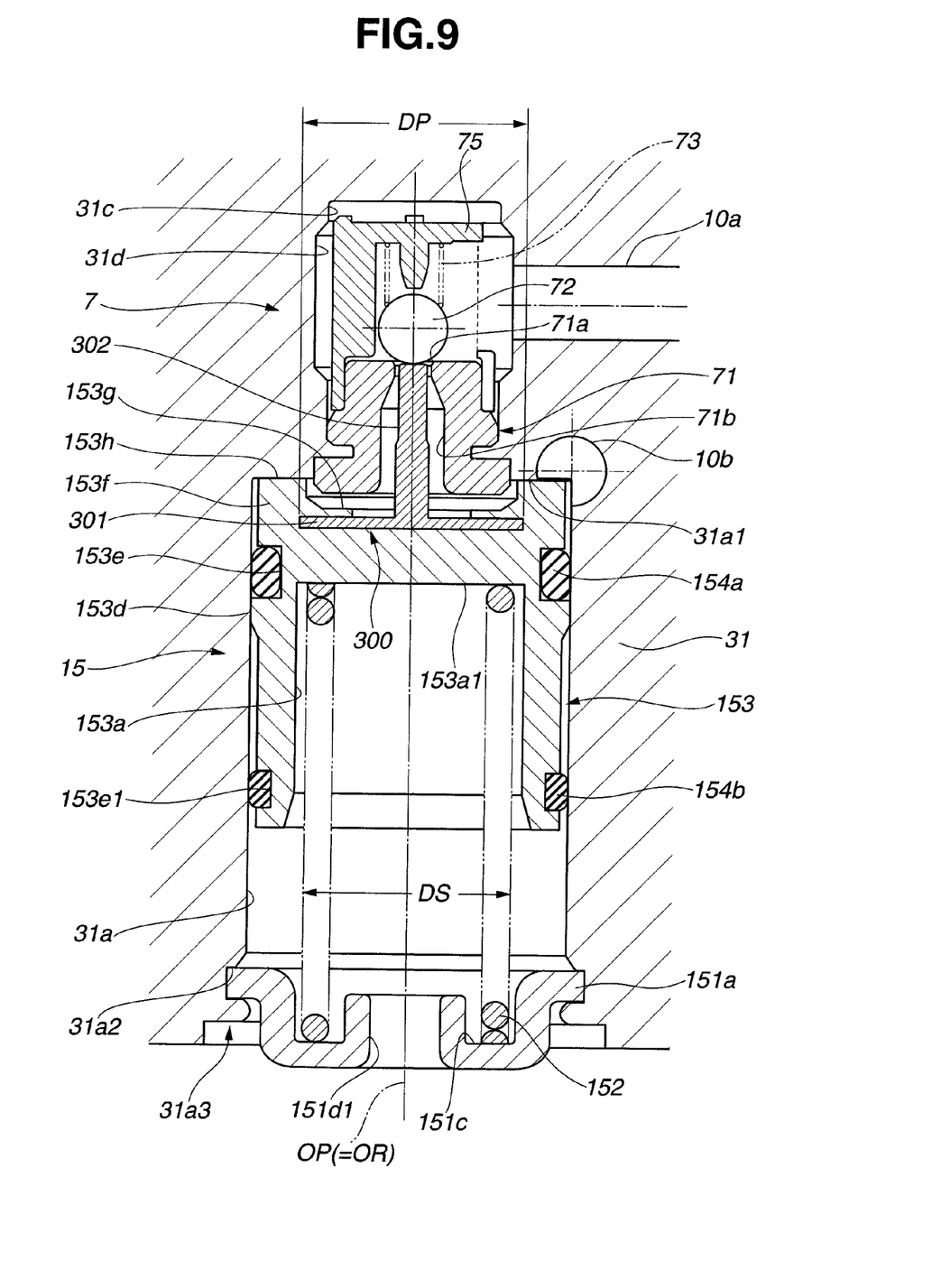
FIG. 9 is an enlarged partial cross section of the brake apparatus according to a fifth embodiment, showing a construction of a reservoir.

Referring to FIG. 9, the brake apparatus according to a fifth embodiment of the present invention is explained. FIG. 9 is an enlarged partial cross section of the brake apparatus according to the fifth embodiment, showing a construction of the respective reservoirs. The fifth embodiment differs from the fourth embodiment in that the rod and the plate member are integrally formed with each other to thereby form an integral rod member. As shown in FIG. 9, integral rod member 300 includes rod portion 302 and plate portion 301. Integral rod member 300 is previously formed, and then, subjected to insert-molding to thereby form piston body 153. The brake apparatus according to the fifth embodiment can attain the same function and effect as those of the brake apparatus according to the fourth embodiment.

Furthermore, other technical concepts and effects of the present invention which are understandable from the above embodiments are described as follows.

(10) In a tenth aspect of the present invention, there is provided a brake apparatus including:
a piston body made of a resin material and disposed in a closed-ended bore formed in a housing, the closed-ended bore being communicated with a fluid passage formed within the housing, the piston body being moved in the closed-ended bore in an axial direction thereof when anti-lock brake system control is executed,
a plate member disposed on a piston crown surface of the piston body, the plate member having a wear resistance higher than that of the resin material of the piston body,
a first elastic member that biases the piston body toward a closed end of the bore; and
a pressure regulating valve disposed in the fluid passage, the pressure regulating valve including a valve element, a seat portion that is brought into contact with the valve element, a rod disposed between the plate member and the valve element, the rod acting to move the valve element apart from the seat portion, and a second elastic member having one end contacted with the valve element and biasing the valve element toward the seat portion, the second elastic member having an elastic force smaller than that of the first elastic member.

With this construction, even in a case the piston body made of a resin material is employed in order to enhance reduction in weight and cost, wear resistance of the piston crown surface against the rod can be enhanced.

(11) In an eleventh aspect of the present invention, there is provided the brake apparatus according to the tenth aspect, wherein the plate member is integrally formed with the piston body. With this construction, the plate member can be produced simultaneously with the piston body upon resin-molding of the piston body, so that the productivity can be enhanced.

(12) In a twelfth aspect of the present invention, there is provided the brake apparatus according to the tenth aspect, wherein the plate member has a disk shape, the first elastic member is a coil spring, the piston body has a cylindrical shape having a closed end on which the coil spring is supported, and the plate member has a diameter larger than an outer diameter of the coil spring. With this construction, the piston crown surface undergoes only the elastic force of the coil spring, and therefore, deterioration in durability of the piston body can be suppressed.

(13) In a thirteenth aspect of the present invention, there is provided the brake apparatus according to the twelfth aspect, wherein the plate member and the rod are formed into an integral part. With this construction, it is possible to enhance durability of these elements without taking into account any wear that would be caused due to the sliding contact between the plate member and the rod when formed as separate parts.

(14) In a fourteenth aspect of the present invention, there is provided the brake apparatus according to the tenth aspect, wherein the diameter of the plate member is larger than a maximum stroke amount of the piston body. With this construction, even in a case where the plate member is released or peeled from the piston crown surface, the stroke motion of the piston body can be ensured without being disturbed, so that stable operation of the piston body can be maintained.

(15) In a fifteenth aspect of the present invention, there is provided the brake apparatus according to the tenth aspect, wherein the piston body is rotatably disposed in the closed-ended bore, and the rod is disposed offset from a rotation axis of the piston body. With this construction, the rod and the plate member are always contacted with each other not in the same position but in different positions in the circumferential direction of the plate member in accordance with rotation of the piston body. As a result, durability of the plate member can be enhanced.

(16) In a sixteenth aspect of the present invention, there is provided the brake apparatus according to the tenth aspect, wherein the piston body includes an annular groove formed on an outer circumferential surface of the piston body, and an annular seal member engaged in the annular groove, the annular seal member sealing a clearance between an inner circumferential surface that defines the closed-ended bore and the outer circumferential surface of the piston body and dividing the clearance into a fluid pressure chamber and an air chamber, and a weld line is formed on a portion of the piston body which is exposed to the air chamber. With this construction, the piston body is configured such that a weld line is formed in the portion in which high accuracy in molding is not required in view of sealability. In other words, the piston body is configured such that a weld line is not formed in the portion in which high accuracy in molding is required. As a result, it is possible to enhance productivity of the piston body and enhance necessary accuracy in molding.

(17) In a seventeenth aspect of the present invention, there is provided a brake apparatus including:
  a piston body made of a resin material and disposed in a closed-ended bore formed in a housing, the closed-ended bore being communicated with a fluid passage formed within the housing,
  a plate member made of metal and disposed on a piston crown surface of the piston body, the plate member being integrally formed with the piston body,
  a coil spring that biases the piston body toward a closed end of the bore; and
  a pressure regulating valve disposed in the fluid passage in the housing, the pressure regulating valve including a valve element, a seat portion that is brought into contact with the valve element, a rod made of metal and disposed between the plate member and the valve element, the rod acting to move the valve element apart from the seat portion, and an elastic member having one end contacted with the valve element and biasing the valve element toward the seat portion, the elastic member having an elastic force smaller than a biasing force of the coil spring, the valve element being spaced apart from the seat portion in a non-operating condition of the pressure regulating valve,
  wherein the brake apparatus has a reservoir function of reserving brake fluid flowed from a wheel cylinder of a vehicle in the closed-ended bore by strokes of the piston body when anti-lock brake system control is executed,
  the piston body has a closed-ended cylindrical shape having a closed end that supports one end of the coil spring, and
  the plate member has a diameter larger than an outer diameter of the coil spring.

With this construction, even in a case the piston body made of a resin material is employed in order to enhance reduction in weight and cost, wear resistance of the piston crown surface against the rod can be enhanced. Further, the piston crown surface undergoes only the elastic force of the elastic member so that deterioration in durability of the piston body can be suppressed.

(18) In an eighteenth aspect of the present invention, there is provided the brake apparatus according to the seventeenth aspect, wherein the plate member is made of stainless steel. With this construction, it is possible to ensure necessary strength of the plate member and anticorrosion property thereof.

(19) In a nineteenth aspect of the present invention, there is provided the brake apparatus according to the eighteenth aspect, wherein the plate member has a disk shape, and a diameter of the plate member is larger than a maximum stroke amount of the piston body. With this construction, even in a case where the plate member is released or peeled from the piston crown surface, the stroke motion of the piston body can be ensured without being disturbed, so that stable operation of the piston body can be maintained.

(20) In a twentieth aspect of the present invention, there is provided the brake apparatus according to the nineteenth aspect, wherein the piston body is rotatably disposed in the closed-ended bore, and the rod is disposed offset from a rotation axis of the piston body. With this construction, the rod and the plate member are always contacted with each other not in the same position but in different positions in the circumferential direction of the plate member in accordance with rotation of the piston body. As a result, durability of the plate member can be enhanced.

This application is based on prior Japanese Patent Applications No. 2010-271206 filed on Dec. 6, 2010, No. 2010-271208 filed on Dec. 6, 2010, and No. 2010-285256 filed on Dec. 22, 2010. The entire contents of the Japanese Patent Applications No. 2010-271206, No. 2010-271208, and No. 2010-285256 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A brake apparatus comprising:
  a housing having a fluid passage and a closed-ended bore communicated with the fluid passage;
  a piston body disposed in the closed-ended bore;
  a first elastic member that biases the piston body toward a closed end of the bore; and
  a pressure regulating valve disposed in the fluid passage, the pressure regulating valve comprising a valve element, a seat portion that is brought into contact with the valve element, a rod disposed between a piston crown surface of the piston body and the valve element, the rod acting to move the valve element apart from the seat portion, and a second elastic member having one end contacted with the valve element and biasing the valve element toward the seat portion, the second elastic member having an elastic force smaller than that of the first elastic member,
  wherein the brake apparatus has a reservoir function of reserving brake fluid flowed from a wheel cylinder of a vehicle in the closed-ended bore by strokes of the piston body when anti-lock brake system control is executed,
  the piston body is a resin-molded member with a hard member, the hard member being fixed to the piston crown surface, the hard member having a hardness larger than that of a resin material of the piston body, and
  the piston body and the rod are brought into contact with each other via the hard member.

2. The brake apparatus as claimed in claim 1, wherein the hard member is a plate member integrally formed with the piston body.

3. The brake apparatus as claimed in claim 2, wherein the plate member has a disk shape, the first elastic member is a coil spring, the piston body has a closed-ended cylindrical shape having the closed end that supports one end of the coil spring, and the plate member has a diameter larger than an outer diameter of the coil spring.

4. The brake apparatus as claimed in claim 3, wherein the diameter of the plate member is larger than a maximum stroke amount of the piston body.

5. The brake apparatus as claimed in claim 4, wherein the piston body is rotatably disposed in the closed-ended bore, and the rod is disposed offset from a rotation axis of the piston body.

6. The brake apparatus as claimed in claim 3, wherein the plate member and the rod are formed as an integral part.

7. The brake apparatus as claimed in claim 3, wherein the plate member comprises a disk-shaped portion and projections or recesses formed on an outer circumferential edge of the disk-shaped portion, the plate member being fixed to the piston body by the projections.

8. The brake apparatus as claimed in claim 1, wherein the piston body comprises an annular groove formed on an outer circumferential surface of the piston body, and an annular seal member engaged in the annular groove, the annular seal member sealing a clearance between an inner circumferential surface that defines the closed-ended bore and the outer circumferential surface of the piston body and dividing the clearance into a fluid pressure chamber and an air chamber, wherein a weld line is formed on a portion of the piston body which is exposed to the air chamber.

9. The brake apparatus as claimed in claim 1, wherein the hard member is a vapor-deposited film.

10. A brake apparatus comprising:
a piston body made of a resin material and disposed in a closed-ended bore formed in a housing, the closed-ended bore being communicated with a fluid passage formed within the housing, the piston body being moved in the closed-ended bore in an axial direction thereof when anti-lock brake system control is executed,
a plate member fixed to a piston crown surface of the piston body, the plate member having a wear resistance higher than that of the resin material of the piston body,
a first elastic member that biases the piston body toward a closed end of the bore; and
a pressure regulating valve disposed in the fluid passage, the pressure regulating valve comprising a valve element, a seat portion that is brought into contact with the valve element, a rod disposed between the plate member and the valve element, the rod acting to move the valve element apart from the seat portion, and a second elastic member having one end contacted with the valve element and biasing the valve element toward the seat portion, the second elastic member having an elastic force smaller than that of the first elastic member.

11. The brake apparatus as claimed in claim 10, wherein the plate member is integrally formed with the piston body.

12. The brake apparatus as claimed in claim 10, wherein the plate member has a disk shape, the first elastic member is a coil spring, the piston body has a cylindrical shape having a closed end that supports the coil spring, and the plate member has a diameter larger than an outer diameter of the coil spring.

13. The brake apparatus as claimed in claim 12, wherein the plate member and the rod are formed into an integral part.

14. The brake apparatus as claimed in claim 10, wherein the plate member has a disk shape, and a diameter of the plate member is larger than a maximum stroke amount of the piston body.

15. The brake apparatus as claimed in claim 10, wherein the piston body is rotatably disposed in the closed-ended bore, and the rod is disposed offset from a rotation axis of the piston body.

16. The brake apparatus as claimed in claim 10, wherein the piston body comprises an annular groove formed on an outer circumferential surface of the piston body, and an annular seal member engaged in the annular groove, the annular seal member sealing a clearance between an inner circumferential surface that defines the closed-ended bore and the outer circumferential surface of the piston body and dividing the clearance into a fluid pressure chamber and an air chamber, and a weld line is formed on a portion of the piston body which is exposed to the air chamber.

17. A brake apparatus comprising:
a piston body made of a resin material and disposed in a closed-ended bore formed in a housing, the closed-ended bore being communicated with a fluid passage formed within the housing,
a plate member made of metal and disposed on a piston crown surface of the piston body, the plate member being integrally formed with the piston body,
a coil spring that biases the piston body toward a closed end of the bore; and
a pressure regulating valve disposed in the fluid passage, the pressure regulating valve comprising a valve element, a seat portion that is brought into contact with the valve element, a rod made of metal and disposed between the plate member and the valve element, the rod acting to move the valve element apart from the seat portion, and an elastic member having one end contacted with the valve element and biasing the valve element toward the seat portion, the elastic member having an elastic force smaller than a biasing force of the coil spring, the valve element being spaced apart from the seat portion in a non-operating condition of the pressure regulating valve,
wherein the brake apparatus has a reservoir function of reserving brake fluid flowed from a wheel cylinder of a vehicle in the closed-ended bore by strokes of the piston body when anti-lock brake system control is executed,
the piston body has a closed-ended cylindrical shape having a closed end that supports one end of the coil spring, and
the plate member has a diameter larger than an outer diameter of the coil spring.

18. The brake apparatus as claimed in claim 17, wherein the plate member is made of stainless steel.

19. The brake apparatus as claimed in claim 18, wherein the plate member has a disk shape, and a diameter of the plate member is larger than a maximum stroke amount of the piston body.

20. The brake apparatus as claimed in claim 19, wherein the piston body is rotatably disposed in the closed-ended bore, and the rod is disposed offset from a rotation axis of the piston body.

* * * * *